United States Patent [19]

Lee et al.

[11] Patent Number: 4,931,715
[45] Date of Patent: Jun. 5, 1990

[54] SYNCHRONOUS MOTOR TORQUE CONTROL DEVICE

[75] Inventors: Robert H. Lee, Fullerton; Alexander Levran, Los Angeles; Chi Mak, Downey; Gerald L. Smith, Torrance; Jacek J. Marcinkowski, San Pedro, all of Calif.

[73] Assignee: Teledyne Inet, Torrance, Calif.

[21] Appl. No.: 156,289

[22] Filed: Feb. 16, 1988

Related U.S. Application Data

[63] Continuation-in-part of Ser. No. 926,220, Nov. 3, 1986, abandoned.

[51] Int. Cl.$^5$ .............................................. H02P 1/24
[52] U.S. Cl. ...................................... 318/709; 318/778
[58] Field of Search ............... 318/778, 806, 798, 705, 318/706, 707, 709, 711, 721–723

[56] References Cited

U.S. PATENT DOCUMENTS

| | | | |
|---|---|---|---|
| 3,665,273 | 5/1972 | Enslin | 318/809 |
| 4,007,401 | 2/1977 | Kimmel et al. | 361/31 |
| 4,084,406 | 4/1978 | Brenneman | 361/22 |
| 4,152,758 | 5/1979 | Bailey et al. | 318/778 |
| 4,409,533 | 10/1983 | Kawabata | 318/778 |
| 4,468,603 | 8/1984 | VanderMeer et al. | 318/778 |
| 4,587,474 | 5/1986 | Espelage et al. | 318/709 |
| 4,634,951 | 1/1987 | Kampf et al. | 318/778 |
| 4,673,858 | 6/1987 | Saito | 318/806 |
| 4,710,692 | 12/1987 | Libert et al. | 318/778 |

Primary Examiner—David Smith, Jr.
Attorney, Agent, or Firm—Monty Koslover

[57] ABSTRACT

A method is described for controlling synchronous motor torque, utilizing a three-phase switch connected in a circuit to the input of a polyphase synchronous motor, and a switch control circuit. The switch control circuit senses the AC voltages input to the synchronous motor and produces signals that open and close the three-phase switch in phase with the input motor voltage, producing positive motor torque during normal operation. If input AC power is lost, the switch control circuit acts to prevent a reverse flow of high current from the motor from entering the power source bus. When input power, after a short time, returns, the switch control circuit acts to close the three-phase switch in such a manner as to permit only real power applied to the synchronous motor and thus positive torque that accelerates the motor speed and quickly restores the motor to synchronism with the input power source.

5 Claims, 14 Drawing Sheets

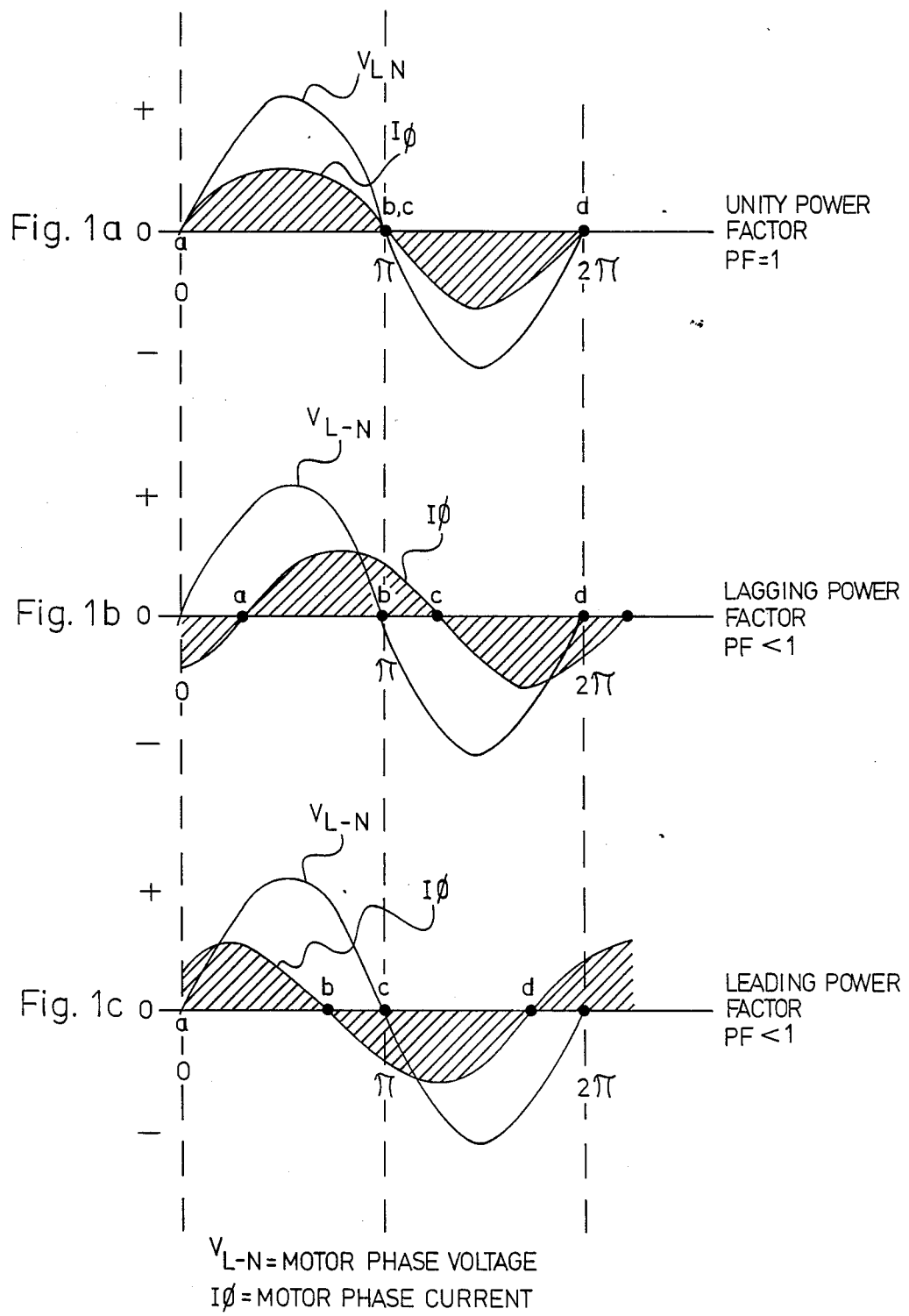

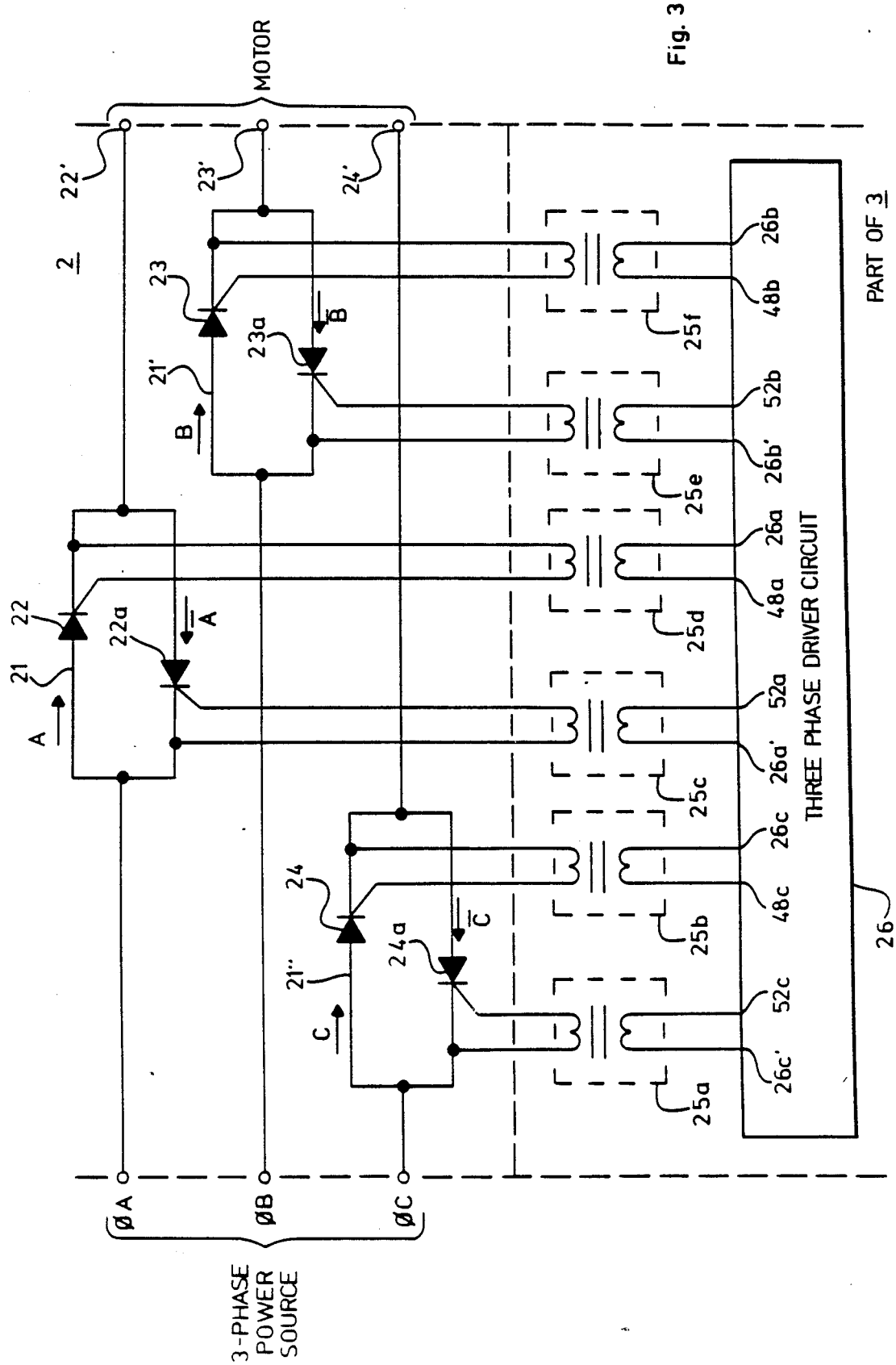

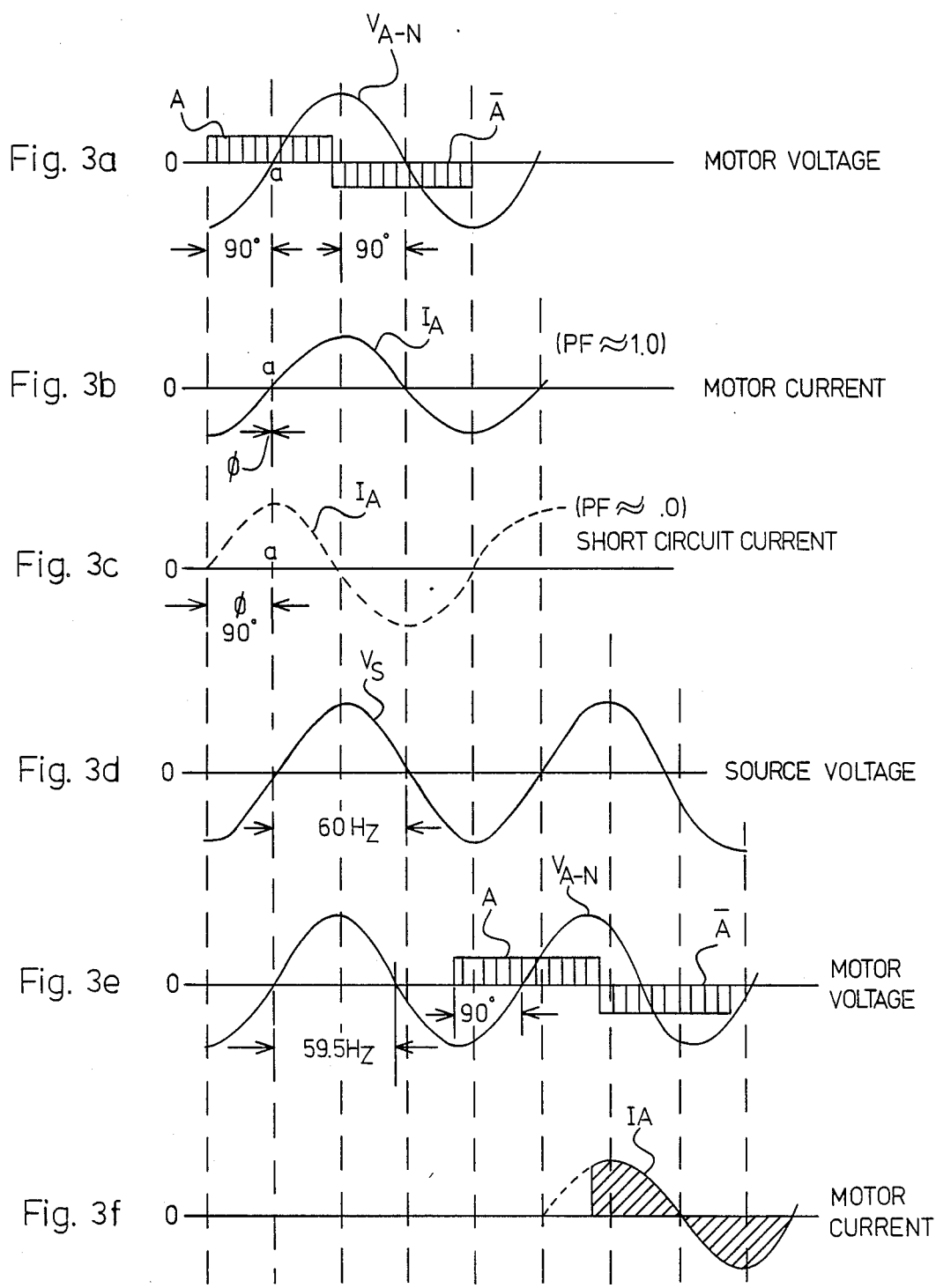

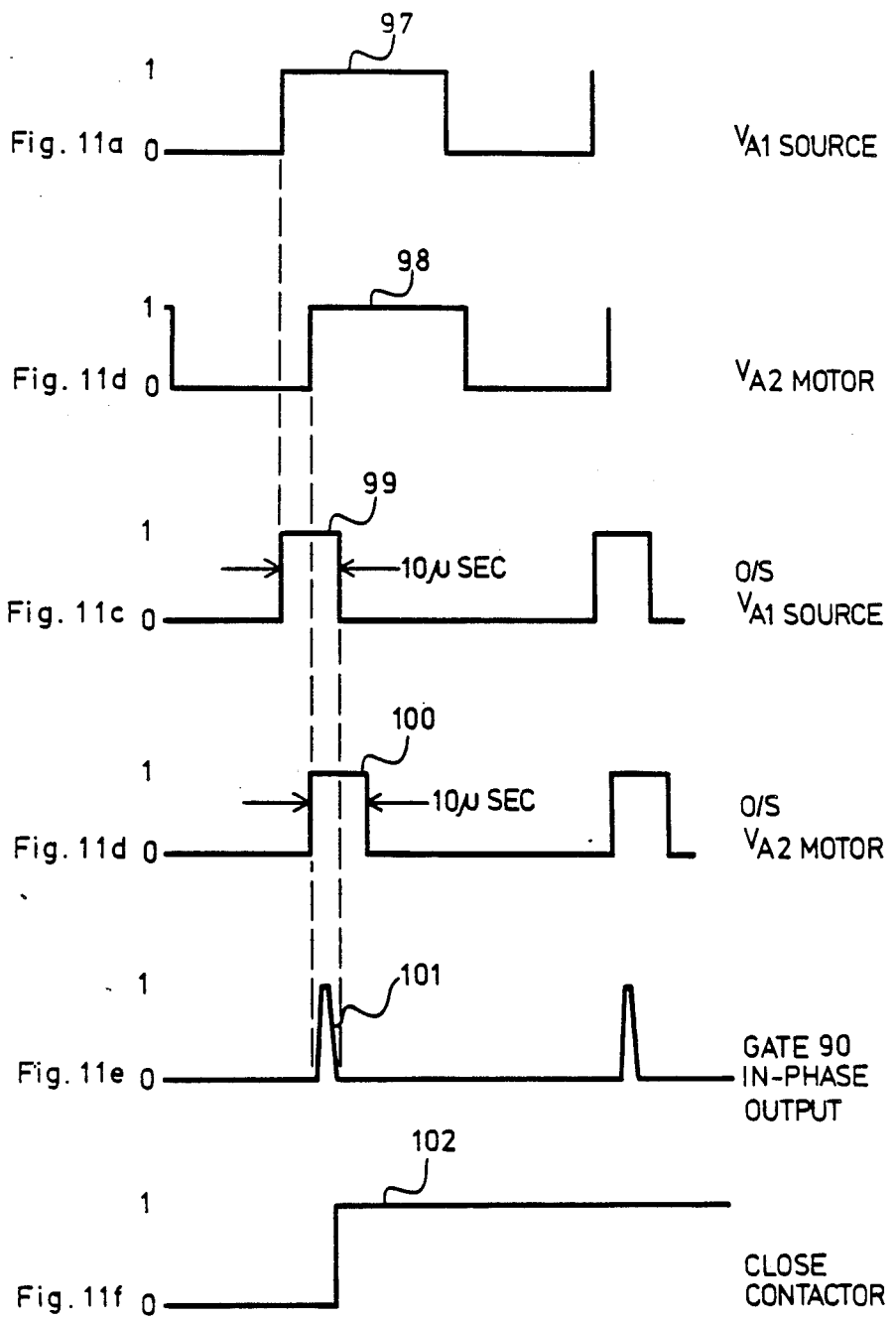

SYNCHRONOUS MOTOR TORQUE CONTROL DEVICE

BACKGROUND OF THE INVENTION

1. The Invention

This is a continuation-in-part of application, Ser. No. 926,220 filed Nov. 3, 1986, now abandoned.

This invention relates to a device and method for controlling the torque applied to a synchronous motor so that it is positive at all times. In particular, the device and method have application to the situation where input AC power is lost for a short time and the motor operates asynchronously with the input AC when power returns. The device operates to bring the motor back to synchronous speed as quickly as possible.

2. Prior Art

There are no known devices and methods for controlling the torque applied to a synchronous motor so that it is positive at all times. The prior art however, does address the matter of returning a synchronous motor to synchronous speed after input AC power is lost and returns after a short time. An example is the system of Frank et al., U.S. Pat. No. 3,829,757 dated Aug. 13, 1974. Frank et al. describe a system for controlling the frequency of the power applied to a synchronous motor. The frequency applied to the motor and therefore its speed, is generated by a current converter that processes the AC input power. During failure of the input power the control setting of the current converter is changed so that upon restoration of AC input power, the frequency of the current converter is commensurate with the reduced speed of the motor. According to Frank, an acceleration from asynchronous to synchronous speed is to be avoided because of possible damage to the load. The current converter output frequency is therefore slowly increased until the motor is operating again at synchronous speed. Because of the expressed need to restrict asynchronous motor operation, the Frank et al. system is limited in use to applications where the motor speed may decrease typically by no more than a few percent. Frank further teaches that a failure detector monitors the input power line and actuates switches that disconnect the motor from the line when input AC power goes away. This system will not prevent a negative surge of motor short circuit current back into the input AC line, causing possible fuse blowing or other damage prior to opening the disconnect breaker or switch.

Another example of the motor speed control approach is the system of Enslin, U.S. Pat. No. 3,665,273 dated May 23, 1972. The system applies to both induction and synchronous type motors. Enslin describes a system where the frequency of an AC power supply is varied by controlling the firing of power control gates in series with the motor windings in an ordered sequence. The variable frequency output of the AC power supply thereby controls the speed of the motor. The system is intended for variable speed control of motors, and does not describe any method for accelerating the motor back to synchronous speed after loss and restoration of AC input power. Since all power to the device is supplied by the AC input power, the loss of AC input power also removes control of the motor from the device. The power control gates will not then prevent a negative surge of motor short circuit current back into the input AC line. In order to prevent the current surge, a logic switch control function that sensed the motor current direction and shut down the power gates would need to be incorporated.

In Huggett et al., U.S. Pat. No. 3,525,913 dated Aug. 25, 1970, a system is described for shutting down a synchronous motor when it is found to have 'pulled out' of synchronism. Huggett teaches that a digital system is used to detect the out of synchronism condition and then to actuate a circuit breaker or similar device to disable the synchronous motor. Operation of the motor at asynchronous speeds is not permitted by this system. Consequently, the motor would need to be restarted when input AC power is restored.

Vander Meer et al., U.S. Pat. No. 4,468,603 dated Aug. 28, 1984, teaches a system of three-phase motor control. The method described, utilizes a thyristor type phase shift controller to provide power saving characteristics, reducing input power to the motor at light loads and avoiding overloads. As taught by Vander Meer et al., the approach applies only when the motor is operating in synchronism with the source, which is the normal situation. The control would not function for a synchronous motor operating in a 'slip' or asynchronous mode, as occurs on recovery from a power outage.

The foregoing prior art describes methods and systems applicable to the control of three-phase synchronous motors. However, it does not fully address the problems of controlling synchronous motors upon loss of input power so as to avoid extreme short circuit current on the source bus, and to facilitate speedy return of the motor to synchronism upon return of input power. The major problems which this patent is intended to solve, are now described.

3. The Problems

Synchronous motors develop rated performance only when operating at speeds which are synchronous with the input AC power line voltage. If the motor is caused to slip out of synchronous speed, the average torque will drop to a low value. A synchronous motor generates an internal AC voltage which is a function of the excitation level of the rotating DC field. In normal synchronous operation, the voltage will be at the same frequency as the input AC power bus voltage from which the motor is receiving energy. The synchronous motor voltage generated internally is designed to be approximately equal to the power line voltage. Single phase power transfer to the motor is:

Power = $E \times I \times \cos(P)$, where:

E is input AC L-N voltage in Volts,
I is input AC current in Amperes,
P is the phase angle between the Phase Voltage and Phase Current,
The product is in Watts of power single phase.

Torque on the motor will tend to be in fixed ratio to the value of this function. Under steady state operation of the synchronous motor the angle P will tend to be constant, while the load is held constant. In the event of a power outage, where the input AC voltage goes to zero, the following occurs:

1. The internal voltage of the motor feeds into a short circuit and current is limited only by the internal impedance of the motor windings.

2. Torque to the motor is negative due to internal losses, and this negative torque combined with the negative torque produced by the load, results in a rapid deceleration of the motor. When AC power returns, the synchronous motor will be operating at a reduced RPM, and the motor output voltage is no longer synchronous with input line voltage. As a result, the phase angle P is now rotating rather than fixed. This causes the motor torque to be positive for approximately half of the time and equally negative during the other half time. There is then no net acceleration of the motor. It is said to have fallen out of synchronism.

Normally the only recourse is to drop the load and to restart the motor without load. Thereafter the load can again be connected to the motor. However, this solution is not acceptable for applications where the motor drives a generator, and the generator load is required to be maintained without a break within a given frequency range. Typical applications are support of computer and communications equipment.

Further, a high current surge feeding back into the line in the event of an input power outage (paragraph 1) may cause damage to other sensitive equipment or blow fuses. This is to be avoided.

Prior art methods such as those described earlier have sought to overcome the problem of temporary loss of motor synchronism by synthesizing the AC power frequency applied to the motor and thus avoiding the problems of controlling motor torque. These methods would appear to work well where the motor is driving a mechanical load directly, and where the time period to return to synchronous speed is protracted as for example when the motor is used to operate textile equipment. However, for motor-generator applications the need is to return to the specified output frequency range (and therefore AC input synchronism) as quickly as possible. Furthermore, sensitive communications equipment must be protected from current surges. Thus, there exists a need for a device and method that will provide quick recovery to synchronous speed for a synchronous motor, and will protect the input source bus from high current surges.

SUMMARY OF THE INVENTION

This invention comprises a method and a circuit connected to a synchronous motor, that acts to control the motor torque at all times and to prevent high current surges from being fed back into the source bus. A three-phase switch is connected in series between the source bus and the synchronous motor. A switch control circuit controls the three-phase switch so as to permit current flow through the motor stator windings only during time intervals when the torque produced by the current flow is positive, and to block current flow during time intervals when current flow would cause negative decelerating motor torque. Thus only positive torque is developed by the synchronous motor, and the motor can continue to operate and support a load at asynchronous speeds. When input source power is lost, the switch control circuit acting on the three-phase switch in series, blocks the reverse flow of high current surges produced by the motor from entering the source bus. When input power returns, the positive applied torque quickly brings the motor back into synchronism.

With the exception of the three-phase static switch, no part of the control circuit processes substantial electric power. All control circuits are signal level, low power and simple in function. As a result, the invention consumes little power and is highly reliable, comparing with prior devices that process and consume significant power losses, and have a lower reliability.

Accordingly, it is a principal object of this invention to provide a method and apparatus that will provide positive power and hence positive torque to a synchronous motor at all times during normal operation.

It is another object of the present invention to provide a method that, even though the motor frequency has dropped considerably following an input power outage, will restore the motor frequency to synchronism with the input source as quickly as possible when input power is restored.

Another object is to provide a method that will prevent high reverse current surges produced by the motor when input power is lost from entering the source bus. It is yet another object to control motor speed and torque utilizing an approach that consumes little power and has a high system reliability.

These and other objects of the present invention will become apparent from the study of the following portion of the specification, the claims and the attached drawings.

BRIEF DESCRIPTION OF THE DRAWINGS

FIGS. 1a–1c are a set of graphs illustrating motor voltage and current relationships, and useful in understanding the theoretical basis of delivered real motor power;

FIG. 3 is a schematic diagram of a first preferred embodiment of a three-phase switch circuit, illustrating also the switch relationship with the switch control circuit, in accordance with the principles of the present invention;

FIGS. 3a–3f are a set of graphs illustrating the voltage-current relationships for normal motor operation, short circuit (loss of input power) and return of input power after loss, and useful in understanding the principles of the present invention;

FIGS. 11a–11f are a set of coordinated graphs illustrating the waveforms in the circuit of FIG. 10, and useful in understanding operation of the circuit.

DETAILED DESCRIPTION OF THE INVENTION

Figure 1:
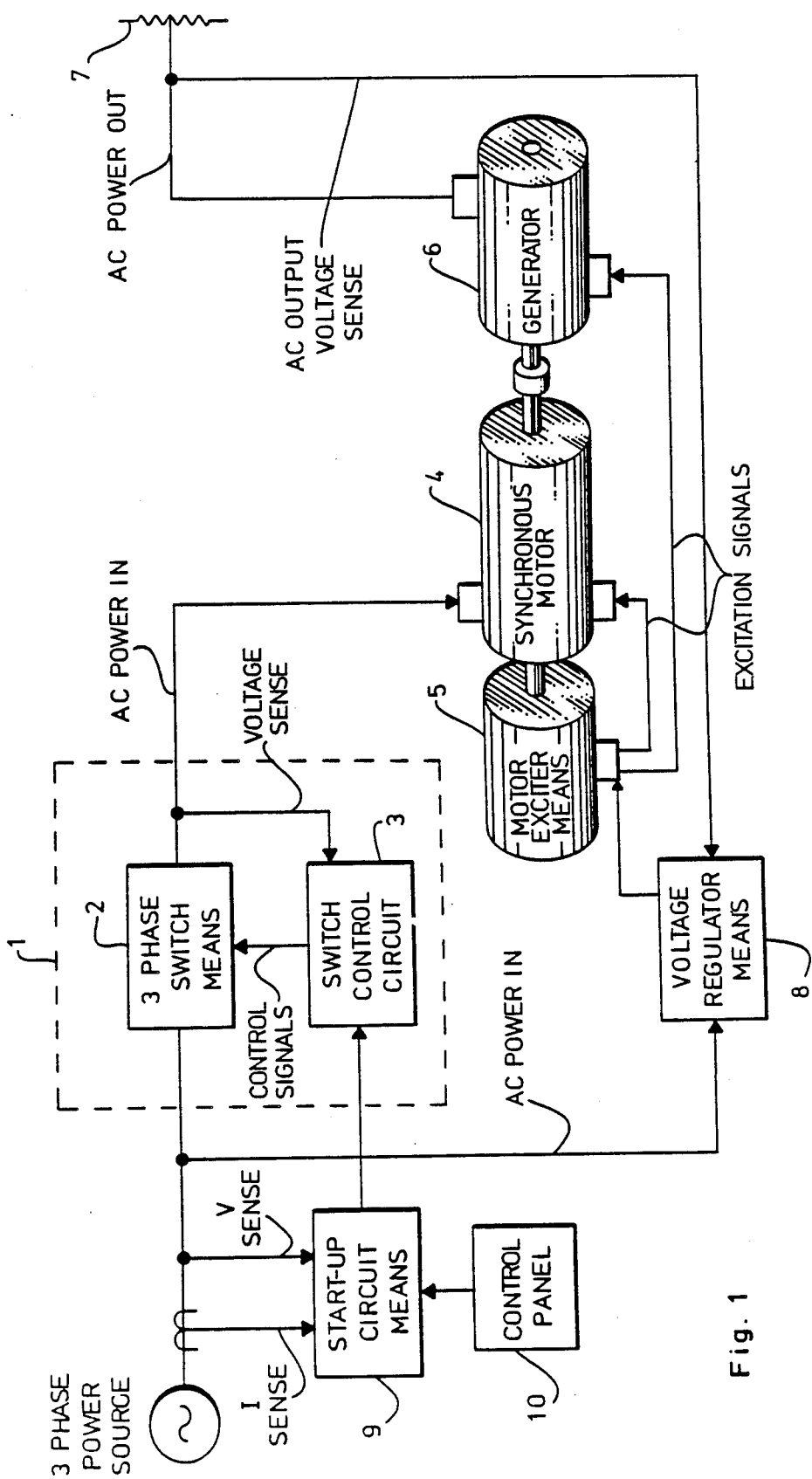
FIG. 1 is a single line block diagram of a typical synchronous motor-generator circuit, incorporating the synchronous motor torque control circuit in accordance with the principles of the present invention.

In describing the first and second preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

Referring initially to FIG. 1, a three-phase sinusoidal power source provides power to a motor torque control circuit 1 comprising a three-phase switch means 2, and switch control circuit means 3, which provides positive AC power flow to a synchronous motor 4. Synchronous motor 4 is coupled mechanically to rotor exciter means 5 and to a generator 6. The generator 6 provides AC power to a load 7. The rotating sections of rotor exciter means 5 and generator 6 act as a load having substantial inertia applied to synchronous motor 4. A voltage regulator 8 senses AC output voltage and controls the AC voltage to a preset value by action on the rotor exciter 5. The rotor exciter means provides DC power for excitation of the rotating fields of both the synchronous motor 4 and the generator 6. An independent exciter may also be used for control of the motor 4 field. This offers an advantage in providing control of input power factor under any load condition and independence of the motor field from the generator field. It is not necessary that the output be AC or that the load be an electrical generator. The generator 6 may or may not operate at the same frequency as the motor 4. An inertial load such as a flywheel, may be coupled to synchronous motor 4 in addition to, or in place of generator 6.

A start-up circuit 9 which senses input voltage and current, communicates with switch control circuit 3 during the start-up period of the motor. Control panel 10 initiates start and stop action of the system.

Input AC power connects through three-phase switch means 2 and thence by way of a power bus to the stator of the synchronous motor 4. Switch control circuit 3 operates to control switch 2 in such a manner that power flow to the motor will be substantially positive for all operational conditions. The three-phase switch 2 can be either electro-mechanical or a solid state type switch. The advantage of a solid state type switch is that it can be more precisely controlled during each cycle so that only positive torque is possible. The speed of the solid state type of control is such that even in the event of a loss of voltage on the AC input power bus, virtually no current is permitted to flow from the motor back into the AC input lines, which would thereupon appear as a short circuit. Use of an electro-mechanical switch for the three-phase switch circuit 2 is somewhat limited. It involves operating the switch to an "off" position when conditions are such that current flow would produce negative motor torque, and to an "on" position when simultaneous conditions are met which are: (1) AC input voltage is present, and (2) the phase angle between the input voltage and synchronous motor voltage are such as to produce positive torque when the mechanical switch is closed. In general, not more than two cycles of this switching operation are required to recover to continuous operation. Therefore, the first preferred means for the three-phase switch 2 is a solid-state or static switch type. A second preferred means for the three-phase switch is an electro-mechanical three-phase contactor. This alternate embodiment is described later in this specification.

Before describing in detail the motor torque control circuit and the method by which control is achieved, understanding of the method will be enhanced by a brief discussion of the theory underlying the approach. This is now presented.

Real power delivered from the source bus to the synchronous motor is derived from the following equation:

$$P_{1\phi} = \frac{1}{T} \int_{\phi}^{T} v(t)i(t)dt \qquad \text{eqn (1)}$$

where $P_{1\phi}$ = single phase power,
T = total time period,
v = motor phase voltage,
i = motor phase current.

Equation (1) is a general relationship, applicable to both sinusoidal and not sinusoidal (harmonic) time dependent functions of motor phase voltage v(t) and motor phase current i(t). Three phase power $P_{3\phi}$ will be $$P_{3\phi} = 3P_{1\phi} \qquad \text{eqn(2)}$$

Refer now to FIGS. 1a, 1b and 1c which depict pure sinusoidal motor phase voltages $V_{L-N}$ and currents IO. In FIG. 1a the phase current I$\phi$ is in phase with the phase line-to-neutral voltage $V_{L-N}$ and the power factor is unity. The power relationship is:

$$\frac{1}{2\pi} \int_{0}^{2\pi} vid\omega t > o. \qquad \text{eqn (3)}$$

The real power delivered to the motor is represented by the overlapping voltage and current areas having the same polarity (positive or negative). In this case all power delivered to the motor is positive since the current waveform is exactly in phase with the voltage waveform. The current zero crossing b coincides with the voltage zero crossing c.

In FIG. 1b the motor current I$\phi$ lags the motor voltage $V_{L-N}$ by the time o—a, here shown as approximately 60 degrees. The power factor is said to be lagging and the power relationship is:

$$\frac{1}{2\pi} \int_{0}^{2\pi} vid\omega t = \qquad \text{eqn (4)}$$

$$\int_{o}^{a} vid\omega t + \int_{a}^{b} vid\omega t + \int_{b}^{c} vid\omega t + \int_{c}^{2\pi} vid\omega t.$$

In equation (4), although the integrals of some areas, namely o—a and b—c, produce reactive (not real) power, sufficient real power may be produced for the motor in a—b and c—d to more than counter areas o—a and b—c. FIG. 1c illustrates a similar situation for the case where the motor current I$\phi$ leads the motor voltage $V_{L-N}$ by the time b—c, and the power factor is said to be leading. In this case, the delivered real power to the motor is approximately the same as for the lagging power factor case. Where the net power delivered to the motor is real or positive, the net torque developed by the motor must also be positive by virtue of motor torque being equal to the real motor power divided by the rotational speed of the motor. Motors can be designed to present a leading or lagging power factor. A typical design power factor is unity power factor.

From the foregoing discussion, it can be seen that for positive motor torque to be produced at all times, the motor current must flow with a sufficient portion of its cycle at the same polarity as the motor line-to-neutral voltage.

Therefore, the invention embodied herein provides a method and mechanism to ensure that motor current flows only coincident with the motor line-to-neutral voltage for all three phases.

As described later, the method comprises the following steps:

1. The motor voltage line-to-neutral for each phase is sensed at the motor terminals.
2. The motor voltage sine waves are converted to square waves that are exactly in phase with the motor voltages.
3. Thyristor gate firing pulses are produced that lead the motor voltage square waves by 90 degrees.
4. The thyristor gate firing pulses are applied to the series thyristor switches, turning them on in sequence.
5. If an input power outage is detected, application of the gate firing pulses is prohibited.
6. When input power returns and a first coincidence of input voltage and motor voltage zero crossing is detected, application of the thyristor gate firing pulses is resumed.

The foregoing method applies to all times after the motor has started. During startup time, a separate control governs application of the thyristor gate firing pulses, relinquishing control when the motor is up to speed.

Figure 2C:
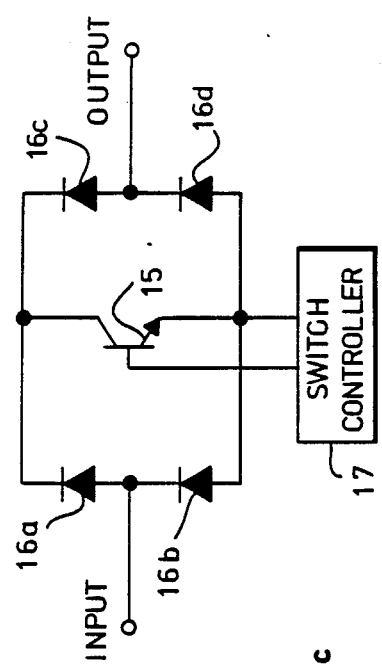
FIGS. 2a–2d are schematic diagrams of one phase of a solid-state switch, controlling the flow of current in either direction and illustrating representative switching approaches.
Figure 2D:
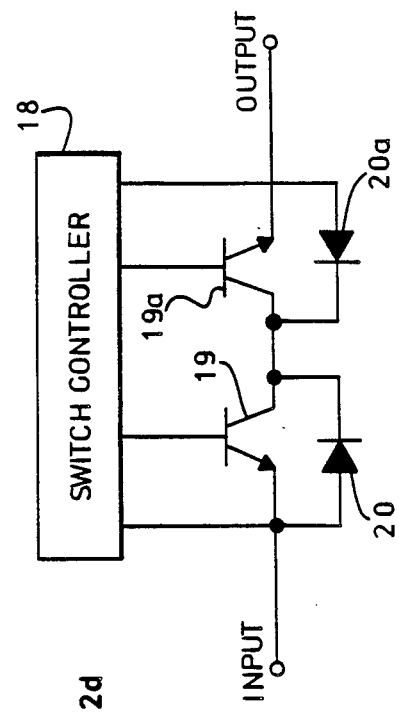
Figure 2A:
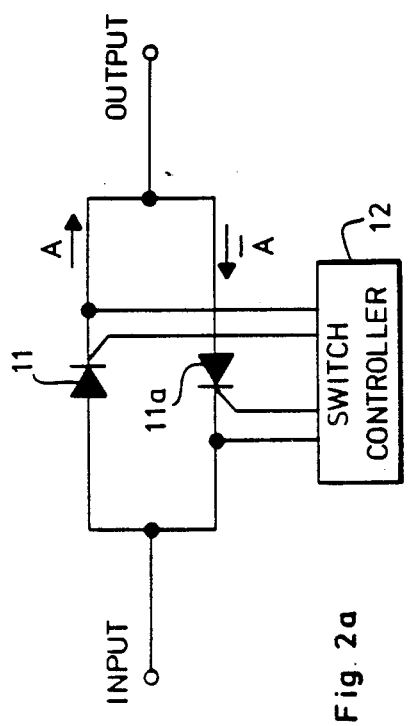
Figure 2B:
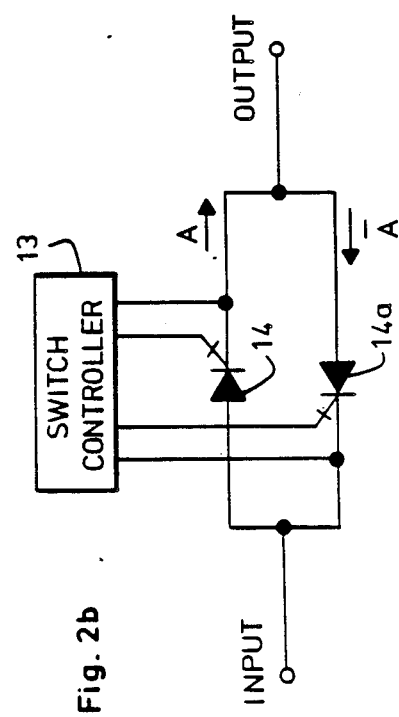

Referring now to FIGS. 2a–2d, there are shown four different solid state type switches which are suitable for use in the three-phase switch. Each illustration shows a single phase switch which would typically be employed for each phase. FIG. 2a illustrates two SCR's or thyristors 11 and 11a in a back to back connection. These can be switched on individually by controller 12, to control flow of current in each direction. Forward current A passes through SCR 11 when it is switched on. Reverse current A passes through SCR 11a when SCR 11a is switched on. FIG. 2b illustrates the use of Gate Turn-Off thyristors (GTO's) 14 and 14a. The circuit operates in the same manner as the circuit of FIG. 2a. GTO's however, have an advantage in that they can be readily switched to an off state at any instant of the cycle, as contrasted with the SCR's which are switched off only when current passes through a zero.

FIG. 2c illustrates the use of a diode bridge circuit which is caused to pass current in either direction by action of a single power transistor. In operation, forward current flows from the input through diode 16a, thence through transistor 15 which is switched on by controller 17, thence through diode 16d and to the output. Reverse current flows through diode 16c, through transistor 15 and back to the input through diode 16b. Transistor 15 is switched on at the appropriate intervals to maintain current flow in both directions as needed.

FIG. 2d illustrates the use of two power transistors 19 and 19a, used in conjunction with bypass diodes 20 and 20a to control flow in either direction. In operation, forward current flows from the input through bypass diode 20 and thence through switched on transistor 19a to the output. Reverse current flows through bypass diode 20a and thence through switched on transistor 19 to the input.

Any of the switches illustrated in FIGS. 2a–2d, used with a controller designed to provide proper gate signals can be made to operate satisfactorily in this application. Other similar switches can be used. The illustrations are not complete but are representative of possible solid state switch configurations.

A static switch configuration is the first preferred embodiment of the three-phase switch. This circuit is illustrated in FIG. 3. For the Phase A switch circuit 21, first SCR 22 and second SCR 22a are utilized in a back to back configuration, and operate as described earlier for the FIG. 2a circuit, which is identical. Phase B switch circuit 21′, utilizes third SCR 23 and fourth SCR 23a, and is identical to Phase A switch circuit 21. Similarly, Phase C switch circuit 21″ utilizes fifth SCR 24 and sixth SCR 24a, and is identical to Phase A switch circuit 21. The gate and cathode terminals of SCR's 22, 22a, 23, 23a, 24 and 24a are connected to the secondary coils of a plurality of isolation pulse transformers 25a–25f. The primary coils of the isolation pulse transformers are connected to the output terminals of a three-phase driver circuit 26.

Both the isolation pulse transformers 25a–25f and the three-phase driver circuit 26 are part of switch control circuit 3.

Using Phase A switch circuit 21 as typical, the following description of motor torque control operation is presented. At this time and during normal operation, the motor terminal voltage $V_{A-N}$ is the same and in synchronism with the source voltage $V_S$. Three-phase driver circuit 26, produces a pulsed gate drive signal at terminals 48a and 26a, which leads the motor terminal voltage $V_{A-N}$ by 90 degrees. Refer to FIG. 3a which shows a waveform representation of the motor line-to-neutral voltage $V_{A-N}$ and the applied gate pulses. The gate pulse is identified by "A" and starts at 90 degrees ahead of the $V_{A-N}$ zero crossover, and continues for 180 degrees. This gate pulse is applied to the gate of positive going SCR 22. Similarly, a pulsed gate drive signal is produced at terminals 26a, and 52a and leads the negative going motor terminal voltage $V_{A-N}$ by 90 degrees. This gate pulse, labeled $\overline{A}$, is applied to the gate of negative going SCR 22a, and continues for 180 degrees. FIG. 3b shows the phase A current $I_A$ that results from applying the gate pulses to the SCR's and turning the SCR's on. In normal operation and running at full load, the motor power factor approximates unity. Therefore, the phase current angle $\phi \approx$ zero, or the current may lag slightly. As depicted in FIG. 3b, the phase current $I_A$ is in phase with the line-to-neutral voltage $V_{AN}$ and maximum real power is delivered to the motor. The developed motor torque is all positive as a result.

Operation of the Phase B switch circuit 21′ and Phase C switch circuit 21″ is identical to that described for the Phase A switch circuit above, except occurring at 120 degrees and 240 degrees separation in time.

Consider now what happens immediately upon loss of input source power to the motor. The internal voltage of the motor feeds into a short circuit and generates 90 degree leading current back into the source bus. However, the SCR gate firing angle for A and $\overline{A}$ shown in FIG. 3a now blocks this current since SCR 22 is back-biased at the time its gate pulse is applied, and the SCR can not turn on. Similarly, SCR 22a can not turn on. As an illustration, the short circuit current that would flow, had the SCRs not been blocking it, is shown in dashed lines in FIG. 3c. At the same time, the Control Logic circuitry depicted in FIG. 4, block 26a and FIG. 4a, detects the loss of input source power and immediately outputs a prohibit signal to the 3-phase gate drivers of the static switch SCRs. The SCR gate firing pulses are then prohibited by the logic until source power return is sensed.

After a short time, during which the motor speed has decreased, the source voltage $V_S$ returns. Its voltage waveform is shown in FIG. 3d. It is assumed that the source is the same as before the interruption, and hence there has been no source voltage phase shift. It is the same as before. The motor voltage frequency meanwhile has dropped from its original 60 Hz to 59.5 Hz for example or even lower. The motor voltage waveform $V_{A-N}$ is shown in FIG. 3e. Both the source voltage $V_S$ and the motor voltage $V_{A-N}$ are sensed and compared by the control logic. Since the difference in frequency is small, the positive-going zero crossing of $V_{A-N}$ will gradually 'walk' toward the positive-going zero crossing of source voltage $V_S$. When co-incidence occurs, the prohibit is removed and gate firing pulses A and $\overline{A}$ are applied to the gates of SCR's 22 and 22a respectively as shown in FIG. 3e. The SCR's turn on and current flows when the source voltage $V_S$ amplitude is greater than the motor voltage $V_{A-N}$. The current waveform for phase A is shown in FIG. 3f.

It should be observed that the initial half wave positive current is small. However, this positive current is sufficient to transmit real power to the motor, producing only positive torque that speeds up the motor. Negative power, and thus negative torque, is not produced. With each succeeding cycle of motor voltage and source voltage, the percentage of real power is increased and the motor is speeded up until synchronism occurs. In practice, if the difference in frequency between motor and source is only 0.5 Hz, synchronism takes place almost immediately after a few cycles.

From the foregoing discussion, it can be seen that blocking of reverse current flow from the motor is automatic, due to the inherent characteristics of the static switch SCRs which act as blocking diodes when cathode-to-anode current is reversed and the gate firing angles are not in coincidence with the reversed current flow. The initial current flowing in the SCRs immediately goes to a value below the "holding" level and the SCRs commutate off. Also, that the timing of the SCR gate firing angle is always keyed to the motor voltage as sensed at the motor terminals. The result is that real power is always maintained during normal operation and during asynchronous operation when recovering from a power outage.

The operation of the switching circuits described above is controlled by the switch control circuit 3, which is now described.

Figure 4:
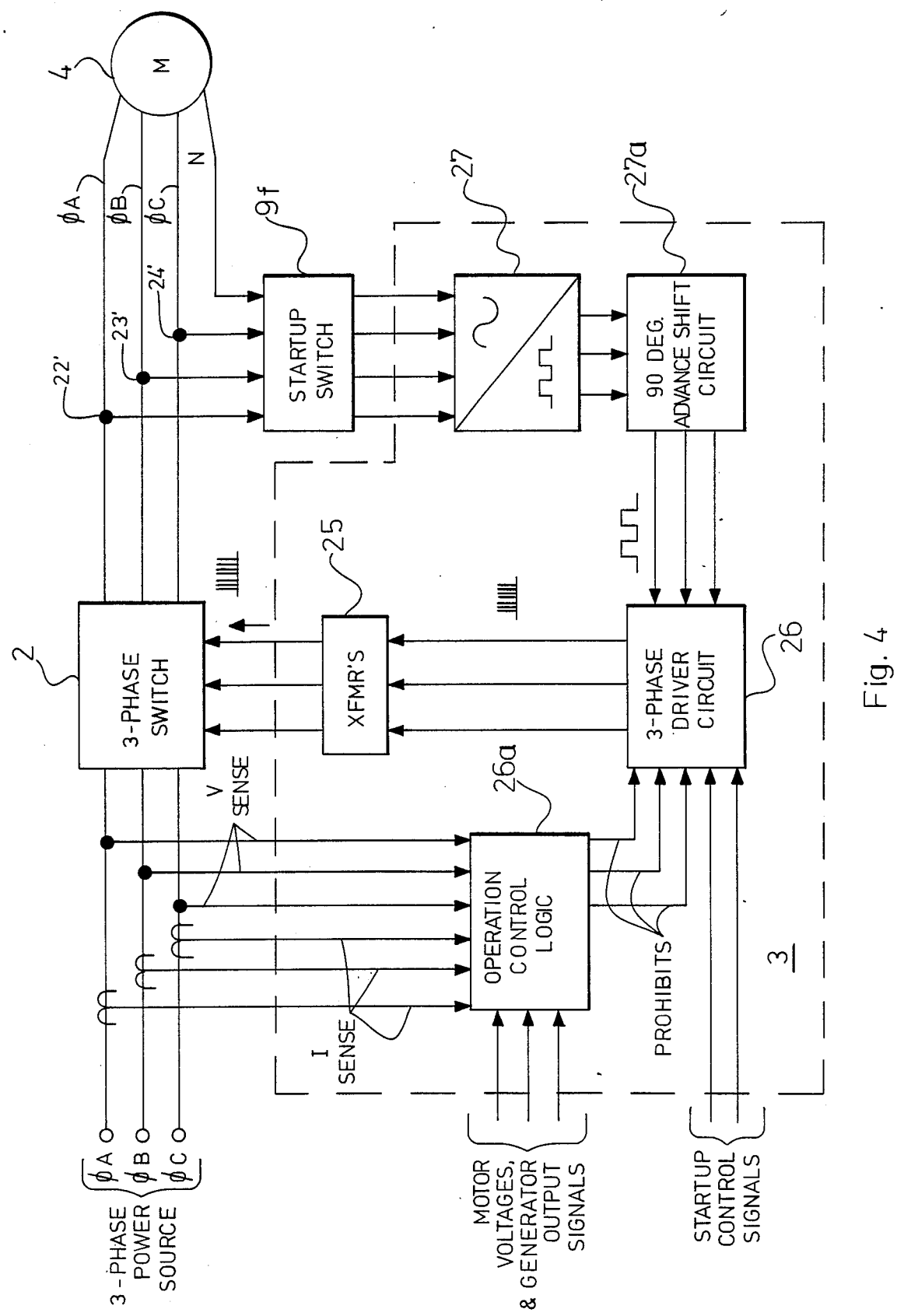
FIG. 4 is a block diagram of a first preferred embodiment of the switch control circuit, showing its relationship to the motor and three-phase switch.

Referring now to FIG. 4, there is shown a block diagram of a first preferred embodiment of switch control circuit 3, and its relationship to three-phase switch 2 and to the synchronous motor 4. Each of the three-phase lines 0A, 0B and 0C, together with a neutral, is connected from terminals 22', 23' and 24' of motor 4 to converter circuit 27. The signal appearing on each of these lines to neutral is a sinusoidal voltage. These signals are converted by converter circuit 27 to DC square waves which are in phase with the motor sinusoidal voltages. The square wave signals are then processed by an advanced shift circuit 27a that advances the square waves so that the square waves lead the sensed motor sinusoidal voltages by 90 degrees. The advanced square waves are transmitted to three-phase driver circuit 26, which operates on them to produce the desired pulsed voltage signal necessary for switching on the SCR's in the three-phase static switch 2, in the correct sequence. During startup time, startup control signals govern the three-phase driver circuit 26 instead of the signals from converter circuit 27. This is a normal and standard operating procedure. The startup control circuit 9 is described later.

In addition to the startup control signals, the three-phase driver circuit 26 is governed by signals from the operation control logic circuit 26a. This circuit senses motor running condition, source current amplitude, source voltage, motor voltage and generator output frequency. The circuit 26a is configured to output prohibit signals to the three-phase driver circuit 26 and prevent switch SCR's from turning on when an overvoltage or overcurrent is detected, thus avoiding damage to the equipment. It also prohibits drive signals immediately after an input power outage is detected.

A synchronism detector in the operation control logic circuit 26a continuously monitors the degree of synchronism or separation between cycles of the source bus voltage and the motor voltage. If the separation (out of synchronism) is greater than the limit, prohibit signals are output to three-phase driver circuit 26, preventing generation of the SCR gate firing pulses and thus preventing the static switch 2 from turning on. During complete loss of source bus voltage, this prohibit function is suppressed.

Another function of the operation control logic is concerned with output frequency (motor or generator). If the generator output frequency is out of range for more than a given time period, an SCR prohibit signal will be transmitted to three-phase driver circuit 26 and the switch SCR's will not be allowed to turn on. Typical time periods allowed for out of frequency conditions are 500 msec for 400 Hz nominal and 100 msec for 60 Hz nominal operation. This time is set according to the motor-generator application.

At all times other than at startup, the driver circuit 26 utilizes the signals output by converter circuit 27. This ensures that the gate drive signals output to the SCR's in three-phase switch 2, will be applied strictly in phase with the motor voltages line-to-neutral. During normal synchronous operation, this ensures that SCR's 22, 23 and 24 will conduct in phase with the positive half of the cycles sensed at the motor terminals 22', 23' and 24' to neutral, and SCR's 22a, 23a and 24a will conduct in phase with the negative half of the cycles so sensed. During normal synchronous motor operation, the phase angle P between motor voltage and current is constant and relatively small. The motor torque, which is in fixed ratio to $E \times I \cos(P)$, will also tend to be constant for a constant load.

Figure 4A:
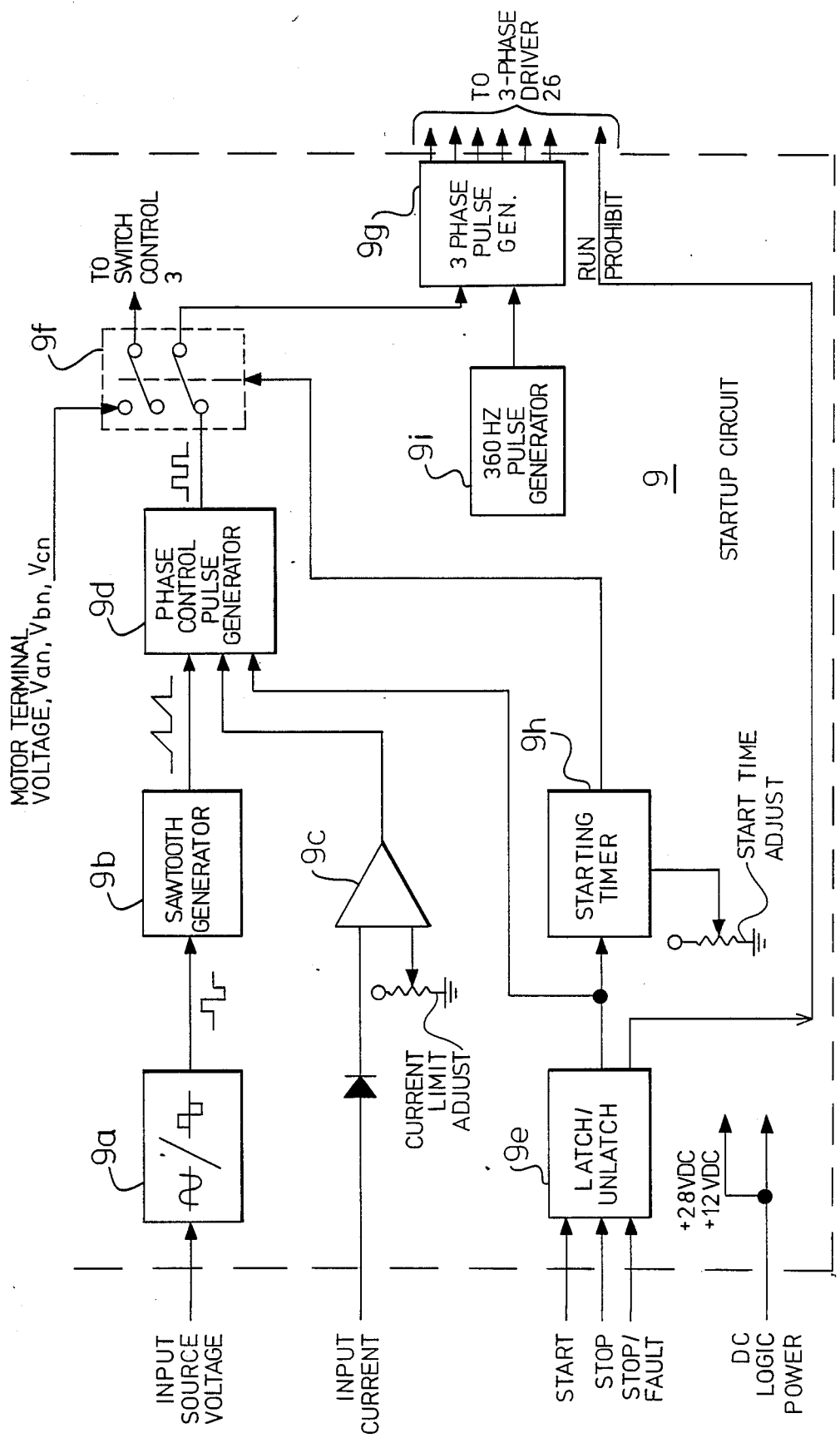
FIG. 4a is a block diagram of an embodiment of the startup circuit means.

Refer now to FIG. 4a which is a block diagram of an embodiment of startup circuit means 9. Inputs are DC power from a logic power supply (not shown), three-phase input source bus voltage and input current; start, stop and fault-stop signals from the control panel 10. During startup, the input bus voltage is input to and processed by sine wave/square wave converter 9a which passes the square wave signal to sawtooth wave generator 9b. At the same time, the motor current sense signal is passed to comparator 9c which compares the current with a reference current limit and outputs a positive signal to phase control pulse generator 9d. The phase control pulse generator 9d accepts the sawtooth wave from generator 9b, the reference signal from comparator 9c and a 'go' high signal from latch/unlatch 9e, and outputs a series of phase control pulses shifted with reference to the input bus voltage. These phase control pulses are passed through closed gate switch 9f and thence to a three-phase pulse generator 9g, whose output in turn is connected to the gate drive of three-phase driver circuit 26. During startup, the three-phase motor terminal voltage signals are disconnected by switch 9f from converter 27 in the switch control circuit 3, disabling its normal operation and reserving control of the driver circuit 26 to the startup circuit 9.

At start, the start signal from the control panel 10 is passed to the latch/unlatch circuit 9e which outputs a high signal to the phase control pulse generator 9d and starts the starting timer 9h. The starting timer 9h outputs a signal to gate switch 9f which maintains switch 9f closed for a fixed adjustable time in the range of 5 seconds to 2 minutes. Either a stop or fault/stop signal input to latch/unlatch 9e from the control panel 10, will remove the high signal to phase control pulse generator 9d, stop the starting timer and send a signal to open switch 9f, removing the SCR firing pulses and opening the static switch 2 SCR's.

A 360 Hz frequency generator provides signal input to the three-phase pulse generator 9g for synchronizing with the phase shift control signal from generator 9d.

Figure 5:
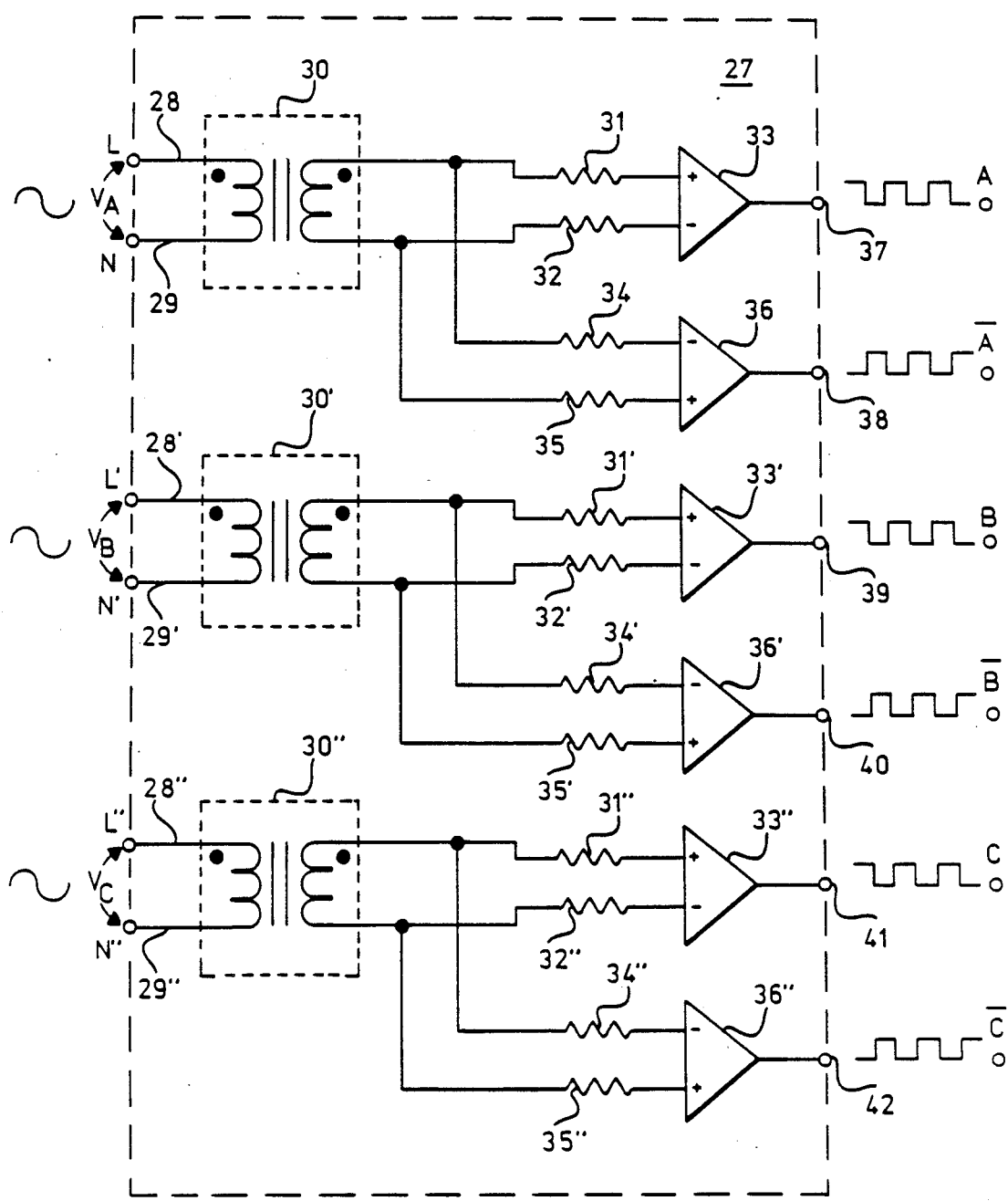
FIG. 5 is a simplified schematic diagram of the sine to square wave signal converter portion of the switch control circuit.
Figure 7:
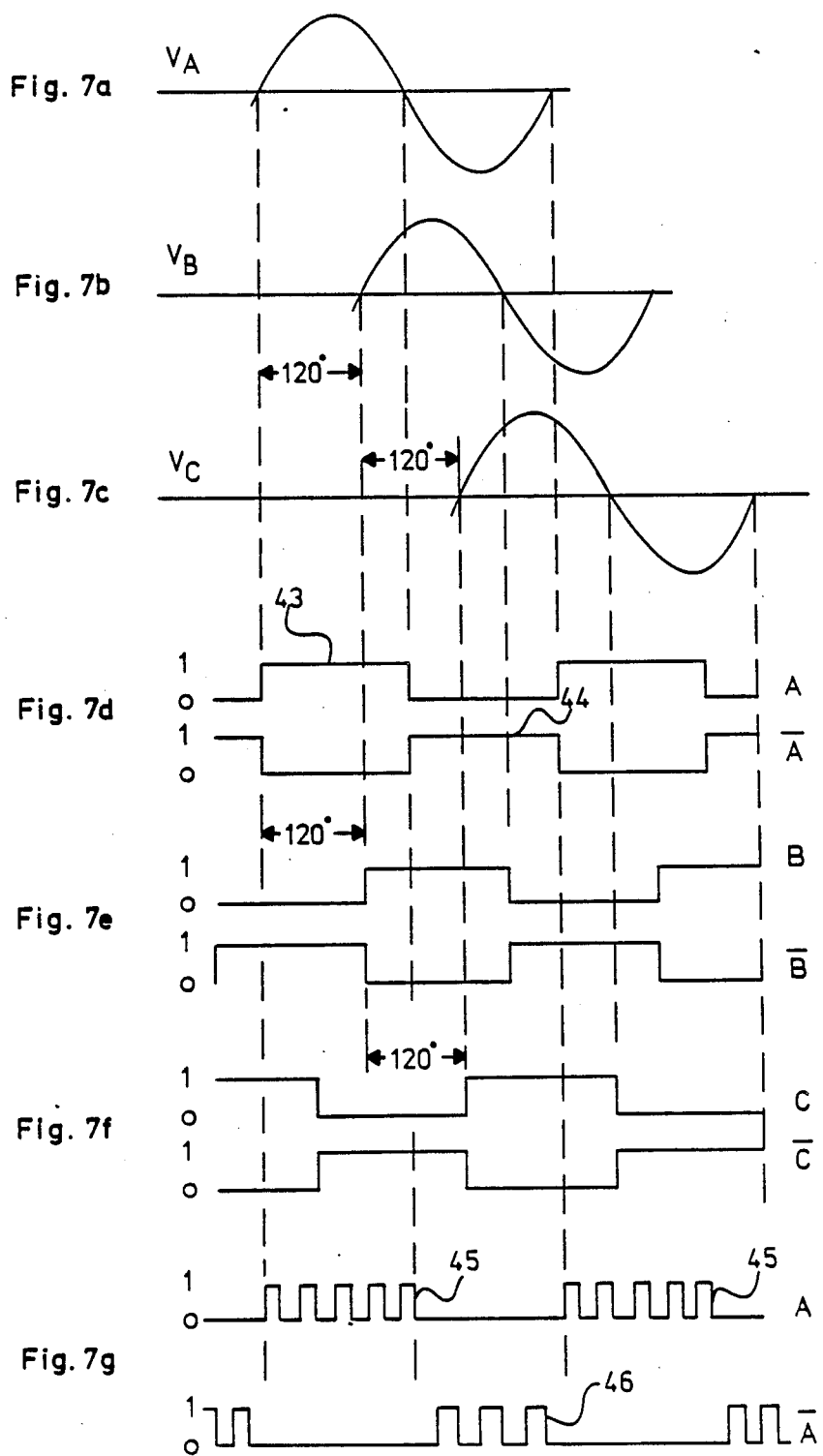
FIGS. 7a–7g are a set of coordinated graphs illustrating the waveforms in the circuits of FIGS. 4, 5 and 6, and useful in understanding operation of the circuit.

FIG. 5 is a schematic of converter circuit 27. The circuit is comprised of three identical subcircuit channels, one for each phase to neutral. The subcircuit for Phase A to neutral, $V_A$, is comprised of first step down transformer 30, first resistor 31, second resistor 32, third resistor 34, and fourth resistor 35, a first comparator 33 and second comparator 36. The motor voltage, $V_A$, which could be 120 Vac or higher, is connected across terminals L to N and thence by lines 28 and 29 to the primary coil of step down transformer 30. The secondary coil of transformer 30 produces a suitably selected low voltage which is transmitted to the input of first comparator 33 via first and second resistors 31 and 32. Resistor 31 is coupled to the non-inverting input of first comparator 33 while resistor 32 is coupled to the inverting input of first comparator 33. Square waves 'A' are produced at output 37 of first comparator 33, each positive going square wave being exactly in phase with the positive half cycle of motor voltage $V_A$. The amplitude of the square waves may be 5 vdc or 10 to 12 vdc depending on the logic selected. Similarly, the secondary of transformer 30 is also connected via resistors 34 and 35 to the input of second comparator 36. However, in this case, resistor 34 is coupled to the inverting input of second comparator 36 and resistor 35 is coupled to the non-inverting terminal. The square waves $\overline{A}$ produced at output 38 of second comparator 36 are positive going square waves, exactly in phase with the negative half cycle of motor voltage $V_A$. Note that the designations A and $\overline{A}$ in this case, relate the square waves to the turn-on of SCR 22 in the positive going section A of Phase A static switch 21, and to the turn-on of SCR 22a in the negative going section $\overline{A}$ of Phase A static switch 21. For ease of reference, the relationship of square waves A and $\overline{A}$ to motor voltage $V_A$, is depicted in FIGS. 7a and 7d.

The converter circuits for $V_B$ sinusoidal input and $V_C$ sinusoidal input, are identical to that described above for $V_A$.

Motor voltage $V_B$, line-to-neutral, is connected across terminals L, to N, and thence by lines 28' and 29' to transformer 30'. The stepped down transformer voltage is transmitted to comparators 33' and 36' via resistors 31', 32', 34' and 35', and the outputs at terminals 39 and 40 are square waves B and $\overline{B}$. Square waves B and $\overline{B}$ and their relationship to motor voltage $V_B$, are shown in FIGS. 7b and 7e for reference.

Motor voltage $V_C$, line-to-neutral, is connected across terminals L" to N", and thence to lines 28" and 29" to transformer 30". The stepped down voltage from transformer 30" is transmitted to comparators 33" and 36" via resistors 31", 32", 34" and 35", and the outputs at terminals 41 and 42 are square waves designated by C and $\overline{C}$. Square waves C and $\overline{C}$ and their relationship to motor voltage $V_C$ are depicted in FIGS. 7c and 7f.

The square wave signals of converter circuit 27 are transmitted to the gate advanced shift circuit 27a for advancing by 90 degrees. The advanced square waves are then passed to three-phase driver circuit 26 where they are converted to pulsed signals for switching on the SCR's in three-phase switch circuit 2.

Figure 6:
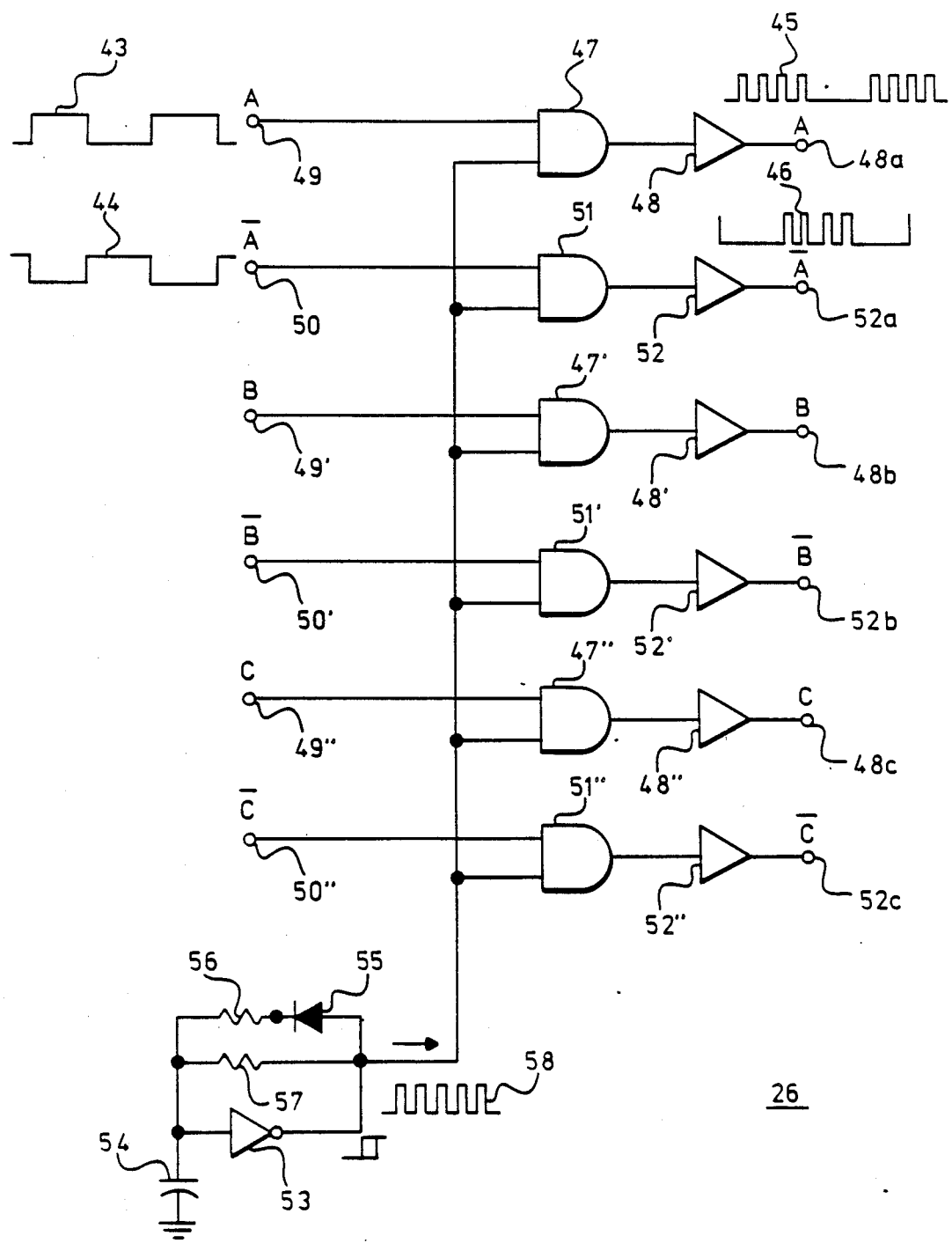
FIG. 6 is a simplified schematic diagram of the three-phase driver circuit portion of the switch control circuit, showing only the circuit portion synthesizing gate drive pulses and omitting control circuits.

Referring to FIG. 6, there is shown a simplified schematic of the preferred three-phase driver circuit 26. Startup and control signal connections are omitted, together with standard power supply connections and supporting circuitry, as not contributing to the understanding of the overall circuit function. They are, however, part of the driver circuit. As shown, the circuit comprises six channels, one each for processing the six sets of square wave signals from converter circuit 27, and an oscillator circuit. The oscillator circuit is a Schmitt-Trigger type and is comprised of gate 53, capacitor 54, diode 55 and first and second resistors 56 and 57. Diode 55 and resistor 56 provide duty cycle control. It is a well known oscillator circuit, that produces continuous "picket fence" signals 58 for further use. The frequency of "picket fence" signals 58 may be selected to be typically in the order of 5 to 100 kHz.

The "picket fence" high frequency output pulses 58 are applied as the reference input to each of the six AND gates 47, 51, 47', 51', 47" and 51". In each channel the input square waves are combined by an AND gate with the high frequency pulses, to form a waveform, typically as shown by sketch 45 and sketch 46, at the output of the AND gate. In the A channel for Phase A, square wave 43 is input at terminal 49 and transmitted to an input of AND gate 47, where it is combined with "picket fence" high frequency pulses, so that the AND gate output waveform 45 consists of high frequency pulses corresponding to the input square wave. For clarity, the relationship with the input square wave 43 is depicted in FIGS. 7d and 7g. Waveform signal 45 is transmitted to driver means 48 which produces drive signals of the required voltage and current at terminal 48a. These drive signals are then provided to isolation pulse transformer 25d as described earlier for the gate drive to SCR 22 in the static switch.

Operation of the $\bar{A}$ channel for Phase A is identical to that described above for the A channel. In this case square wave 44 is input at terminal 50, combined with high frequency pulses by AND gate 51, and waveform 46 produced at the AND gate output. Waveform 46 corresponds to input square wave 44, and its relationship to square wave 44 is illustrated in FIGS. 7d and 7g. The drive output is at terminal 52a of driver 52, and is provided to isolation pulse transformer 25c for gate drive to SCR 22a.

The channels for Phase B, indicated by B and $\bar{B}$ in FIG. 6, and the channel for Phase C, indicated by C and $\bar{C}$, operate in the identical fashion as that described earlier for Phase A.

Phase B square waves B and $\bar{B}$, are input to terminals 49' and 50' respectively, and drive signals produced at terminals 48b and 52b, similar to those illustrated for waveforms 45 and 46. Phase C square waves C and $\bar{C}$, are input to terminals 49" and 50" respectively, and drive signals produced at terminals 48c and 52c.

The Phase B drive output signals at 48b and 52b are provided to isolation pulse transformers 25f and 25e for transmittal to the gates of Phase B static switches SCR 23 and SCR 23a. Similarly, the Phase C drive output signals at 48c and 52c are provided to isolation pulse transformers 25b and 25a for transmittal to the gates of Phase C static switches SCR 24 and SCR 24a.

Having previously described the first preferred embodiment of switch control circuit 3 and three-phase switch 2, a second presently preferred embodiment utilizing a mechanical three-phase switch is now described.

Figure 8:
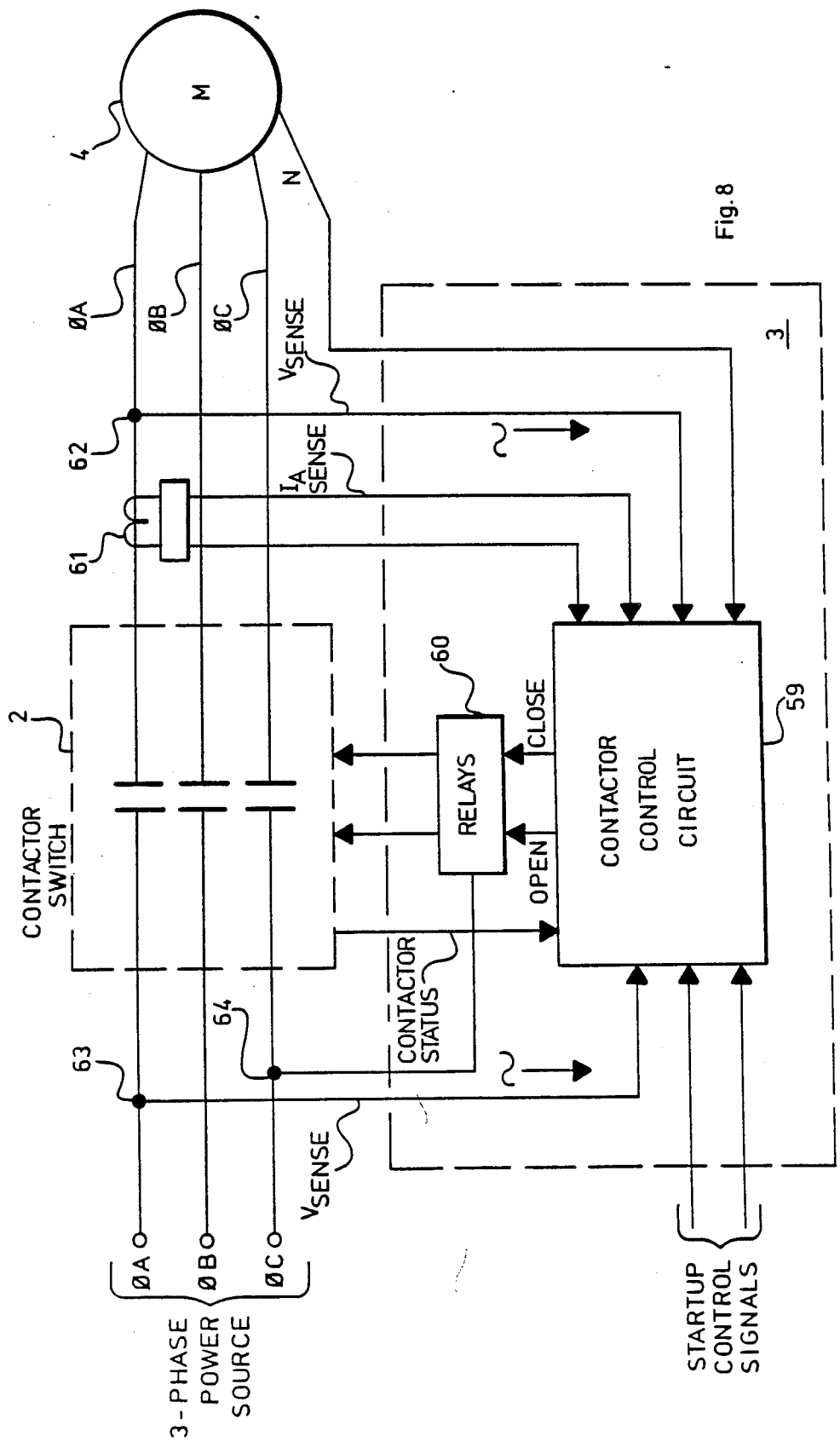
FIG. 8 is a block diagram of another presently preferred embodiment of the switch control circuit, illustrating the use of a three-phase contactor switch in place of a three-phase static switch, and a contactor control circuit.

Referring to FIG. 8 there is shown a block diagram of a second presently preferred embodiment of switch control circuit 3 and its relationship to three-phase switch 2 and to the synchronous motor 4. Three-phase switch 2 is a three-phase contactor that is normally open, and maintained closed when a contactor coil (not illustrated) is energized. Motor voltage Phase A line together with a neutral, is connected from terminal 62 of motor 4 to contactor control circuit 59. Current transformer (CT) 61 which senses the motor current in Phase A, is also connected to contactor control circuit 59. Both the voltage sense and current sense signals are sinusoidal voltages. However, current transformer 61 incorporates a burden resistor and outputs a low AC voltage signal whose amplitude is related to the value of the sensed current in Phase A motor input. On the source input side of three-phase switch 2, source voltage Phase A line together with a neutral, is connected from terminal 63 to contactor control circuit 59. Three-phase switch 2 status is communicated to contactor control circuit 59 by a line from auxiliary switch contacts.

During startup time, startup control signals applied to contactor control circuit 59, produce a close contactor signal which is communicated to the control relay circuit 60. The control relay circuit, which is energized by the AC input line 64, responds by energizing the three-phase contactor coil, closing the contactor. This is held closed until tripped by command from the contactor control circuit 59. In normal operation, Phase A to neutral motor 4 voltage and Phase A current, are continuously monitored by contactor control circuit 59. If the phase angle between voltage and current becomes too great, exceeding a set threshold, the contactor control circuit will output a 'trip contactor open' signal. This could occur in the event of a loss of AC input voltage. The three-phase switch 2 is opened and no current is permitted to flow from the motor 4 back into the AC input power lines. When voltage reappears on the AC input power lines, the source Phase A voltage $V_A$ is compared with the Phase A voltage generated by the motor 4 for phase relationship. At the time that a coincidence of phase between the two voltages is detected, a 'close contactor' signal is output by the contactor control circuit 59 to the control relays 60, and the three-phase switch 2 is closed.

Figure 9:
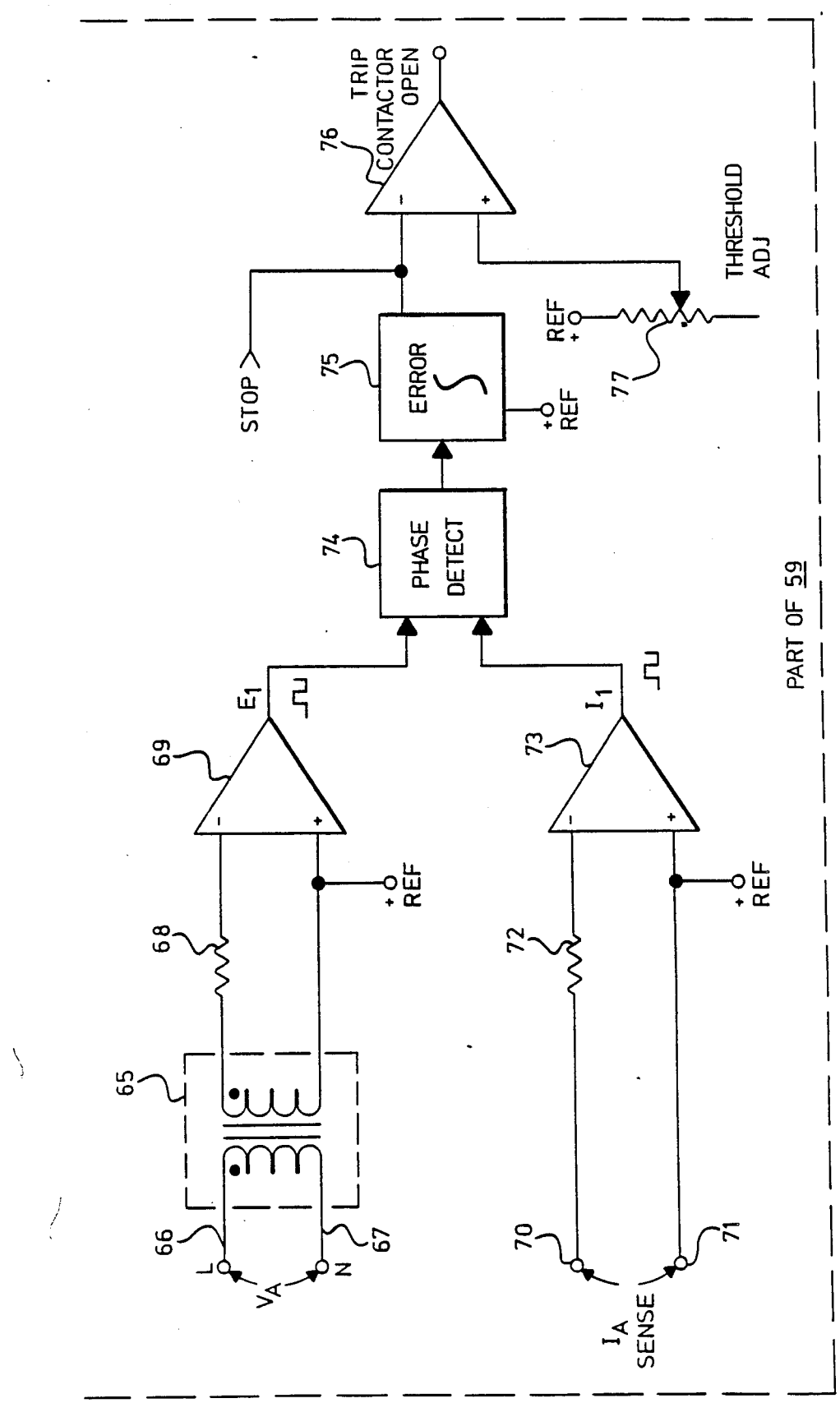
FIG. 9 is a simplified schematic diagram of a contactor trip circuit portion of the contactor control circuit.

FIG. 9 is a schematic diagram of a 'contactor trip' circuit portion of contactor control circuit 59. To enhance understanding of operation, the circuit is shown without the necessary filtering and power supply support components which are incorporated. The motor voltage $V_A$, which could be 120 Vac or higher, is connected across terminals L to N and thence by lines 66 and 67 to the primary coil of first step down transformer 65. The secondary coil of transformer 65 produces a suitable low AC voltage which is transmitted to the input of first comparator 69 via first current limiting resistor 68. A square wave $E_1$, is produced at the output of first comparator 69, each DC positive going square wave being exactly in phase with the positive half cycle of motor voltage $V_A$. The amplitude of the square wave may be 5 vdc or 10 to 12 vdc depending on the logic selected. Current sense signal $I_A$ from the CT 61 on the Phase A motor line, is applied to terminals 70 and 71, and thence via second current limiting resistor 72 to the input of second comparator 73. A square wave $I_1$ is produced at the output of second comparator 73, each positive going square wave being exactly in phase with the positive half cycle of motor current $I_A$.

Square wave signals $E_1$ and $I_1$ are both input to phase detector 74, that produces a signal having a duty cycle proportional to the phase angle difference P between $E_1$ and $I_1$. The phase detector 74 output signal is communicated to error integrator 75, which integrates the signal received with those received prior to it, and establishes the phase angle difference P. At the same time, error integrator 75 compares the absolute value of phase angle P with a reference, to establish the difference error from the nominal values. Error integrator 75 constantly outputs a signal to amplifier 76, whose amplitude represents the phase angle P difference error. Thus, if source input power is lost, the phase angle difference between motor voltage and current will increase quickly and be detected by phase detector 74 and error integrator 75. Amplifier 76 compares the signal received from error integrator 75 with a threshold voltage established by phase threshold adjuster 77. If the threshold is exceeded, a 'contactor trip' open signal is transmitted to the control relays 60. The threshold is adjusted so that a trip signal will result before the phase angle difference P reaches 180 degrees, thus preventing back current flow and negative motor torque. A 'stop' signal originating at the equipment control panel, and applied to the input of amplifier 76, will also trip the contactor open.

Figure 10:
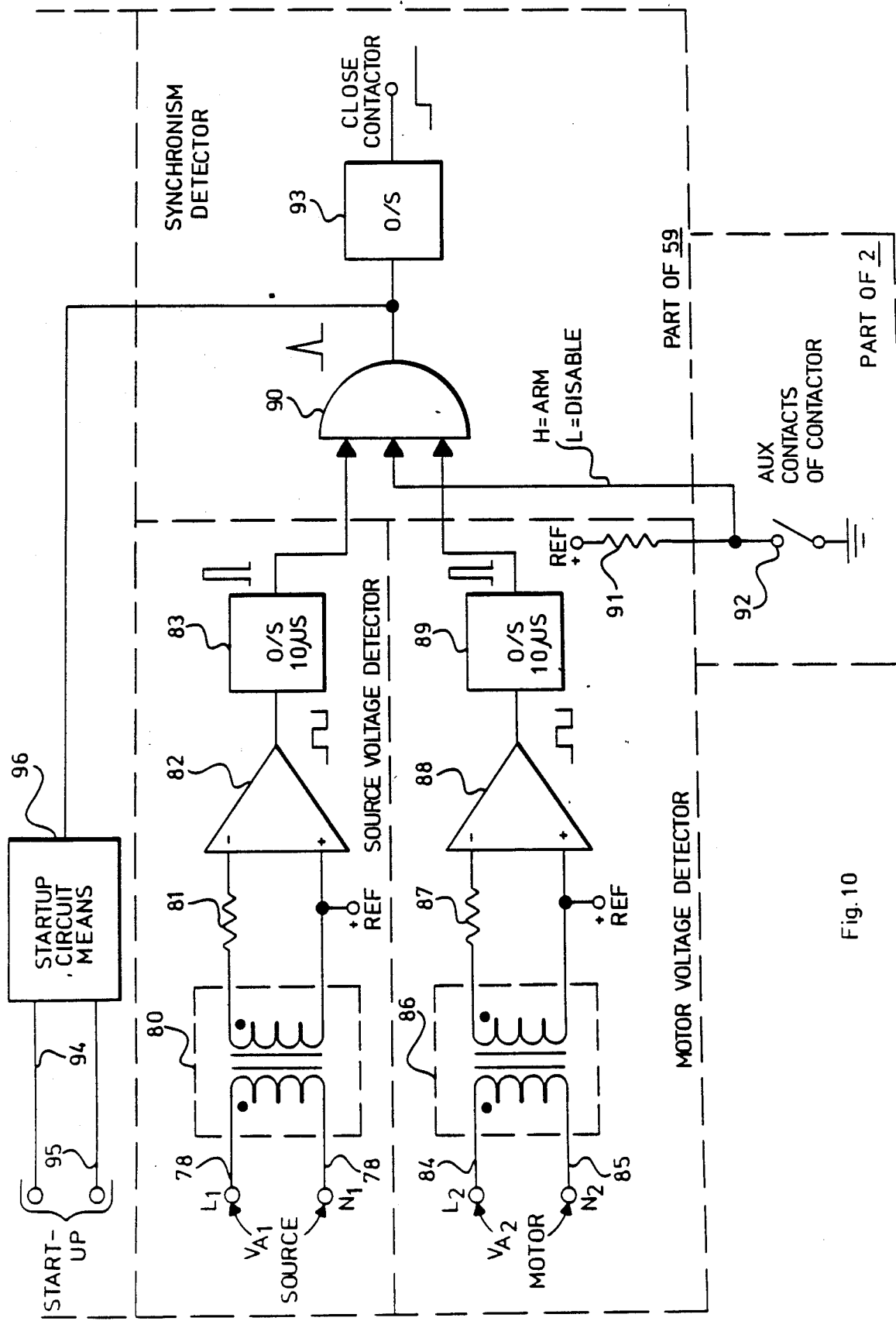
FIG. 10 is a simplified schematic diagram of a contactor close circuit portion of the contactor control circuit.

Referring now to FIG. 10, there is shown a simplified schematic diagram of a 'contactor close' circuit portion of contactor control circuit 59. This circuit is utilized to determine when the three-phase contactor should be closed and is comprised of a source voltage detector subcircuit, a motor voltage detector subcircuit and a synchronism detector. Source voltage $V_{A1}$, is connected across terminals $L_1$ to $N_1$ and thence by lines 78 and 79 to the primary coil of second step down transformer 80. The secondary coil of transformer 80 produces a suitable low AC voltage which is transmitted to the input of third comparator 82 via third current limiting resistor 81. A square wave 97 depicted in FIG. 11a, is produced at the output of third comparator 82, each positive going square wave being exactly in phase with the positive half cycle of source voltage $V_{A1}$. The square wave is input to a first 'one-shot' circuit 83, set with a 10 microsecond tolerance window 'One-shot' circuit 83 processes the input square wave and outputs a 10 microsecond width voltage pulse 99 shown in FIG. 11c. The start of the 10 microsecond pulse 99 coincides exactly with the leading edge of the $V_{A1}$ DC input square wave 97. Using an identical circuit to that described above for the $V_{A1}$ source voltage, the motor voltage $V_{A2}$ is processed to produce a second 10 microsecond pulse. Motor voltage $V_{A2}$ is connected across terminals $L_2$ to $N_2$ and thence by lines 84 and 85 to the primary coil of third step down transformer 86. The secondary coil of transformer 86 produces a suitable low voltage which is transmitted to the input of fourth comparator 88 via fourth current limiting resistor 87. A square wave 98 depicted in FIG. 11b is produced at the output of fourth comparator 88, each positive going square wave being exactly in phase with the positive half cycle of motor voltage $V_{A2}$. This square wave is input to a second 'one-shot' circuit 89, which produces a 10 microsecond width voltage pulse 100 shown in FIG 11d. The start of the 10 microsecond pulse 100 coincides exactly with the leading edge of the $V_{A2}$ motor voltage square wave 98.

The outputs of both the motor voltage detector and source voltage detector subcircuits described above are fed to a synchronism detector as follows:

The outputs of both the first 'one-shot' circuit 83 and second 'one-shot' circuit 89 are connected to the input of AND gate 90. A third input to AND gate 90 is obtained from the auxiliary contacts 92 of the three-phase contactor 2. A reference voltage is connected by resistor 91 across auxiliary contacts 92, so that a 'high' voltage signal will appear when the auxiliary contacts 92 (and the three-phase contactor) are open. A 'low' voltage appears when the auxiliary contacts 92 are closed. The 'high' (H) condition allows an arming of AND gate 90 while a 'low' (L) condition causes a disable condition. Arming of the AND gate is provided when the three-phase contactor 2 is open and requires closing. A disable of the AND gate is necessary when three-phase contactor 2 is already closed and 'close contactor' signals are therefore undesirable. AND gate 90 looks at the phase tolerance windows represented by the two 10 microsecond voltage pulses input to it representing the monitored voltage waveforms, and if as depicted in FIGS. 11c and 11d, there is an overlap, AND gate 90 will output a spike voltage pulse 101 shown in FIG. 11e. The spike voltage output will be inhibited if the third input from the auxiliary contacts 92 is low. The AND gate 90 output is connected to the input of third 'one-shot' circuit 93, which is shown in FIG. 11f, outputs a high 'close contactor' signal when it receives the proper spike voltage input, causing the three-phase contactor switch to close.

At startup, signals from the equipment control panel are input to the startup circuit means 96 via lines 94 and 95. The output of the startup circuit means is directly connected to the input of third 'one-shot' circuit 93, providing, when energized, an output voltage spike similar to the output of AND gate 90, and resulting in 'close contactor' signal from 'one-shot' circuit 93.

From the above description, it is apparent that the first and second preferred embodiments achieve the objects of the present invention. Alternative embodiments and various modifications of the embodiments depicted will be apparent from the above description, to those skilled in the art. These and other alternatives are considered to be equivalent, and within the spirit and scope of the present invention.

Having described the invention, what is claimed is:

1. A method for controlling the torque developed by an electrical polyphase synchronous motor that receives energy from an electrical three-phase sinusoidal power source, said motor coupled to a generator and/or to an inertial load; comprising the steps of:
   (a) sensing motor line-to-neutral voltage for each phase at the motor terminals and transmitting the sensed voltages to switch control circuits;
   (b) converting the sensed motor voltage sine waves to square waves that are exactly in phase with the sensed motor voltages;
   (c) processing and advancing the input square waves from step b to produce thyristor gate firing pulses that lead the motor voltage by 90 degrees;
   (d) applying the thyristor gate firing pulses to the thyristors in a three-phase static switch which is in series with the motor input lines, and turning on the thyristors in sequence;
   (e) prohibiting the application of thyristor gate firing pulses if an input power outage is detected;
   (f) detecting a first coincidence of input source voltage and motor voltage zero crossing after the input power returns, and resuming the application of thyristor gate firing pulses to the thyristors in the three phase static switch; and
   (g) controlling the switching of the three phase static switch to permit net positive power input to the motor, producing positive motor torque and therefore an acceleration of the motor to synchronism with the source power as quickly as possible.

2. The method of claim 1 wherein step (e) includes: prohibiting the application of thyristor gate firing pulses if an input overvoltage or overcurrent is detected.

3. The method of claim 1 wherein step (e) includes: prohibiting the application of thyristor gate firing pulses if an out-of-synchronism frequency condition, greater than a pre-determined limit, is detected between the source bus voltage and the motor voltage.

4. In combination with a circuit for controlling operation of a polyphase synchronous motor to maintain synchronous speeds; said circuit utilizing a three-phase contactor that is connected in series with said polyphase synchronous motor; said circuit having sensed inputs connected to the terminals of said synchronous motor and to the input power lines of a three-phase power source, and having a 'contactor close' circuit and a 'contactor trip' circuit which produce signals that are connected to relays, that in turn, energize or deenergize the coil causing said three-phase contactor to close or to trip open;

the improvement claimed being the modification of said 'contactor close' circuit; said contactor close circuit comprising a motor voltage detector subcircuit and an identical source voltage detector subcircuit, an AND gate, a third 'one-shot' circuit, the auxiliary contacts of said three-phase contactor and a startup circuit means; each identical voltage detector subcircuit comprising a stepdown transformer, a current limiting resistor, a comparator and a 'one-shot' circuit; in said source voltage detector subcircuit, the primary coil of a second stepdown transformer being coupled line-to-neutral Phase A with said power source, receiving a sinusoidal input voltage signal; the secondary coil of said second stepdown transformer being connected to the input of a third comparator via a third current limiting resistor; said third comparator producing a DC square wave which is in phase with the positive half cycle of the sensed source voltage; the output signal of said third comparator being communicated to the input of a first 'one-shot' circuit which processes said DC square wave input and outputs a 10 microsecond or suitable width voltage pulse coinciding with the leading edge of said DC input square wave; said motor voltage detector subcircuit being identical in every way to said source voltage detector circuit described above, except that its input is coupled line-to-neutral, Phase A with the terminals of said synchronous motor; the 10 microsecond voltage pulses from both the said motor voltage and source voltage detector subcircuits being communicated to the input of said AND gate; said AND gate also having connected a status input line originating at the auxiliary contacts of said three-phase contactor and indicating contactor status by a 'low' for contactor closed and a 'high' for contactor open states; said AND gate looking at the phase tolerance windows represented by said voltage pulses; if there is an overlap in the 'windows' and if the contactor status line is high, said AND gate will output a spike voltage pulse to the input of said third 'one-shot' circuit; said third 'one-shot' circuit upon receiving said spike voltage, outputting a high 'close contactor' signal which is communicated to said control relay means causing closure of said three-phase contactor; the input of said third 'one-shot' circuit also being connected to the output of said startup circuit means, and responding to receipt of such 'startup' signal by outputting a high 'close contactor' signal.

5. A method for providing quick recovery to synchronous speeds for a polyphase motor upon return of input power following a power outage, said polyphase motor receiving energy from an electrical polyphase sinusoidal power source, said polyphase motor coupled to a generator and/or to an inertial load; comprising in combination the steps of:
 (a) sensing power source line to neutral voltages and transmitting the sensed voltages to switch control circuits;
 (b) sensing motor line to neutral voltages and transmitting the sensed voltages to switch control circuits;
 (c) producing pulsed drive signals in a sequence that is related to the sensed condition of said power source and motor voltages;
 (d) applying the pulsed drive signals to the gates of switches in a polyphase static switch means which is in series with the motor input lines and turning the switches on in sequence; and
 (e) controlling the switching of the polyphase static switch means to permit positive power input to the motor, producing positive motor torque and therefore an acceleration of the motor to synchronism with the source power as quickly as possible.

* * * * *